Patented Apr. 21, 1931

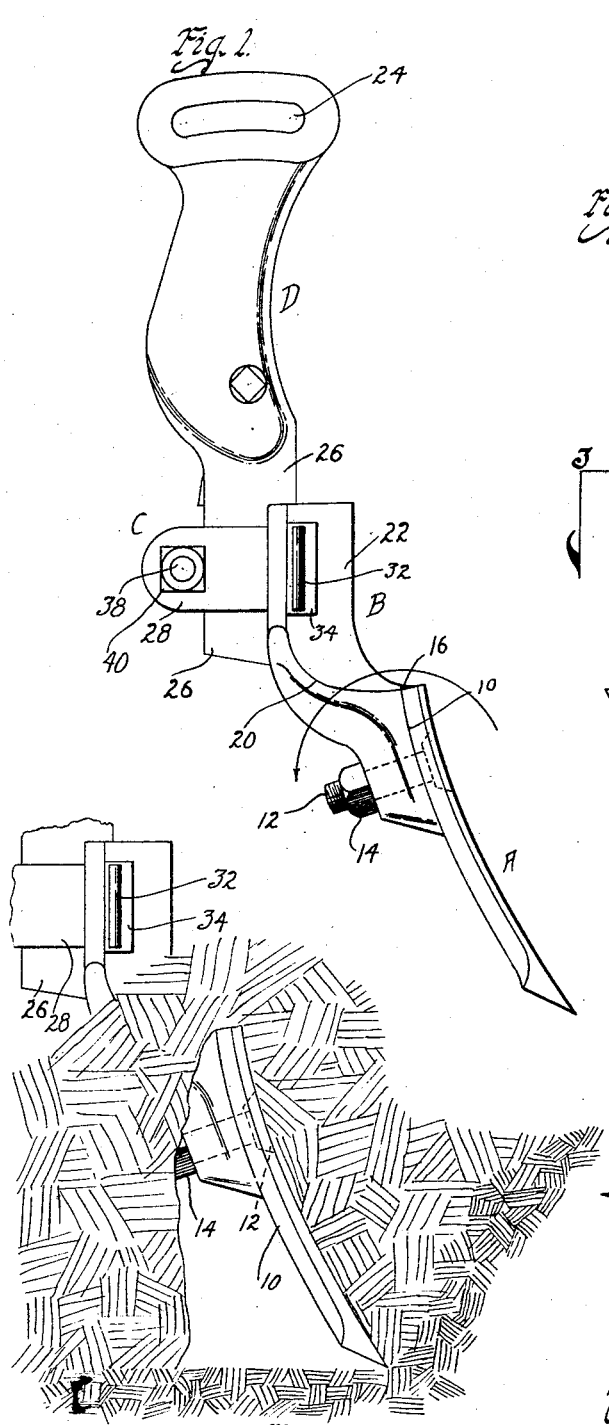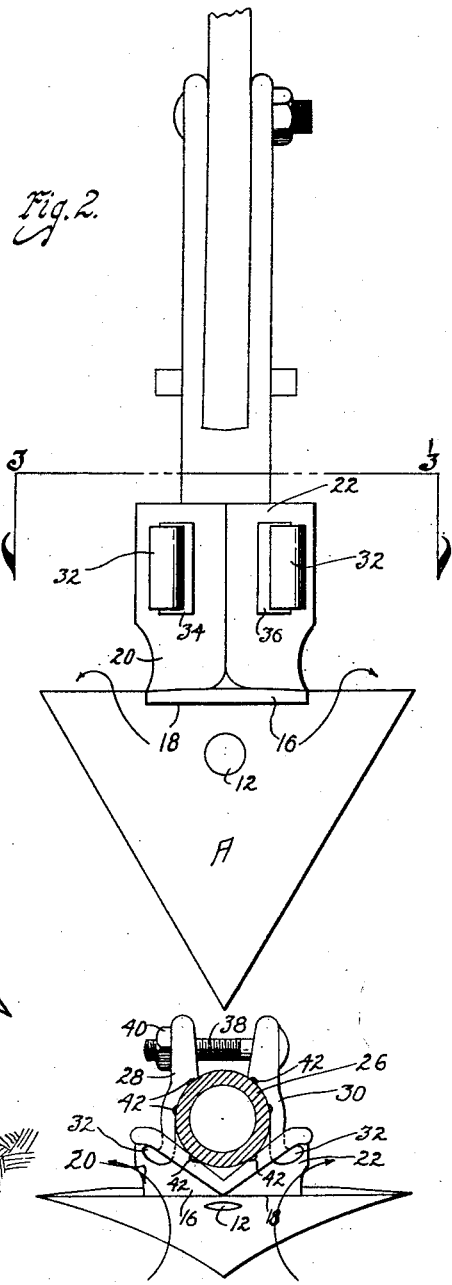

1,801,567

UNITED STATES PATENT OFFICE

WILLIAM HOWARD OSMUNDSON, OF PERRY, IOWA

CULTIVATOR SHOVEL

Application filed December 18, 1929. Serial No. 414,979.

The object of this invention is to provide an improved construction for a cultivator shovel, particularly with respect to the shape of the attaching member, to insure that the ground surface, after cultivation, will be left as smooth and level as possible.

A further object of the invention is to provide an improved rearwardly offset, relatively narrow attaching member for a cultivator shovel to minimize the amount of obstruction and retardation of earth passing over the top of the shovel during use.

Still another object is to provide a cultivator shovel including a removable point on an offset attaching member.

Another and further object is to provide an improved method of securing the shovel attaching member to the cylindrical portion of a shank, to keep said member from turning on the shank.

With these and other objects in view, my invention consists in the construction, arrangement and combination of elements hereinafter set forth, pointed out in the claims and illustrated by the accompanying drawing, in which—

Figure 1 is a side elevation showing a cultivator shovel constructed in accordance with my invention, and mounted on the shank of a cultivator.

Figure 2 is a front view of the same.

Figure 3 is a horizontal section on the line 3—3 of Figure 2.

Figure 4 is a side elevation illustrating roughly the course of travel of soil plowed up by the shovel point.

In the drawings I have shown a cultivator blade or point A, an attaching member B, often referred to as the shovel "back", and a clamp device C for securing the shovel to a cultivator shank D.

The shovel blade or point A is of triangular shape and is detachably mounted on the attaching member or "back" B.

The attaching member B is preferably a malleable casting and it has at its lower forward part a flat face 10 adapted to contact with the upper rear face of the point A. The two parts are detachably connected by a bolt 12 having its head countersunk in the face of the point A, and having a nut 14 threaded on its rear end.

The attaching member B is formed, just above the flat face 10, with a shoulder 16 which is received within a rectangular notch 18 formed centrally at the upper part of the shovel point A. This assists the bolt 12 in securing the point to the attaching member, and effectively prevents any twisting movement.

Immediately above its flat face 10 and shoulder 16, the attaching member B is formed with a rearwardly offset portion 20, and it continues upwardly therefrom as a substantially V-shaped seat member 22, having its central angle directed forwardly. This angle also continues downwardly, on a concave curve, throughout the offset portion 20 to the central part of the shoulder 16, and terminates just above the center of the shovel point A.

The upper part of the shank member D may be formed, according to the usual construction, with a slot 24 to assist in attaching it to the cultivator. The lower part of the shank includes a cylindrical portion 26.

The clamp device C includes two counterpart clamping members 28 and 30, oppositely arranged on opposite sides of the cylindrical shank portion 26, and shaped to fit somewhat thereabout.

Each clamping member includes at its forward end a laterally directed hook 32 and these hooks are positioned through vertical slots 34 and 36 formed in opposite sides of the V-shaped seat member 22.

The clamping members 28 and 30 extend rearwardly beyond the cylindrical shank portion 26 and are apertured to receive a clamping bolt 38. When the nut 40 is drawn tightly on the bolt 38, a clamping engagement with the member 26 is effected.

To provide a better means for gripping the cylindrical member 26, I form the inner faces of the seat member 22 and clamping members 28 and 30 with vertical corrugations, thus providing a plurality of edges or corners which are capable of securely gripping the rounded surface with which they contact, somewhat after the maner of a pipe wrench. The corrugations or teeth may be made by forming parallel vertical grooves 42 in the surfaces of the seat and clamping members, as shown in Figure 3.

Inasmuch as the point A is detachably secured to the attaching member B, it may be removed for sharpening or for substituting a new point.

The attaching member B is narrow and on account of being pointed or V-shaped, it offers little resistance or obstruction to the passage of plowed soil over the top of the cultivator point. This minimizes and tends to eliminate the piling up of soil in front of and above the point during the cultivating operation. In this connection it may be noted that the front surface of the shoulder 16 is flush with the surface of the shovel point, by being set into the notch 18.

This arrangement, and particularly the offset 20, whereby the upper part of the attaching member and shank are located rearwardly of the plane of the shovel point, produces a quick "break over" of the plowed soil. This tends to leave the surface of the ground quite level and smooth after cultivation, providing a better dust mulch around the plants.

This arrangement also tends to prevent the accumulation of weeds, vines and trash about the shovel point.

I claim as my invention—

1. In a cultivator shovel, an attaching member or shovel "back" offset rearwardly between its ends, whereby the upper part thereof is spaced rearwardly from the shovel point, that portion of the attaching member located above the top of the point being substantially V-shaped with its angle pointing forwardly, the forward line of the last named portion curving rearwardly and upwardly on an arc from the central top portion of the shovel point.

2. In a cultivator shovel, a shovel point, an attaching member having a lower portion secured to the rear face of the point and having an upper portion adapted to be attached to a cultivator part, said attaching member being offset rearwardly substantially in the plane of the top of the point to facilitate the passage of plowed soil and to prevent the accumulation of trash.

3. In a cultivator shovel, a shovel point, an attaching member having a lower portion secured to the rear face of the point and having an upper portion adapted to be attached to a cultivator part, said attaching member being offset rearwardly substantially in the plane of the top of the point to facilitate the passage of plowed soil and to prevent the accumulation of trash, the upper part of the attaching member being formed with rearwardly sloping sides.

4. In a cultivator shovel, a shovel point, an attaching member having a lower portion secured to the rear face of the point and having an upper portion, formed as a substantially V-shaped seat, adapted to be attached to a cultivator part, said attaching member being offset rearwardly substantially in the plane of the top of the point to facilitate the passage of plowed soil and to prevent the accumulation of trash.

WILLIAM HOWARD OSMUNDSON.